Patented May 6, 1930

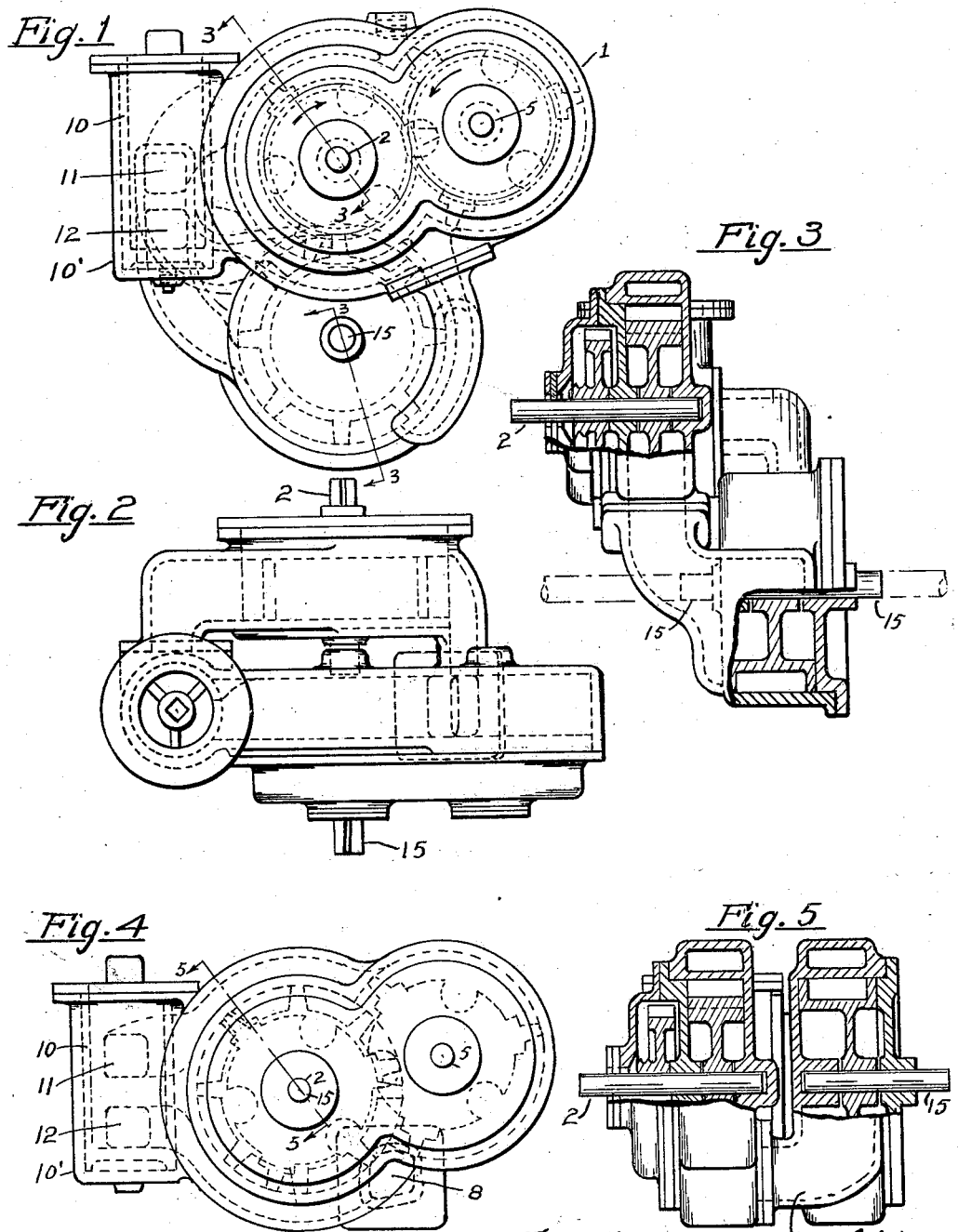

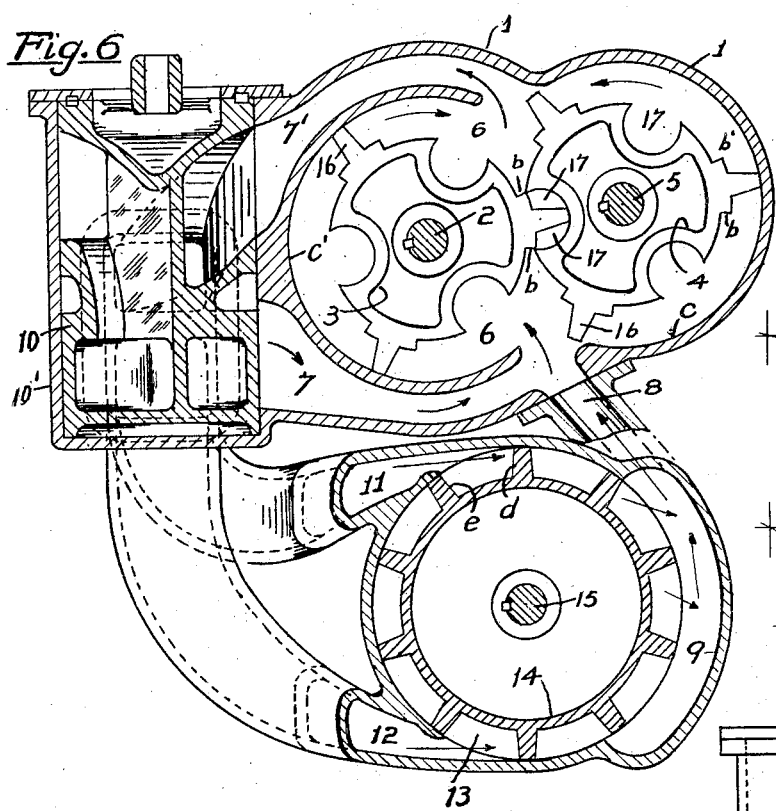
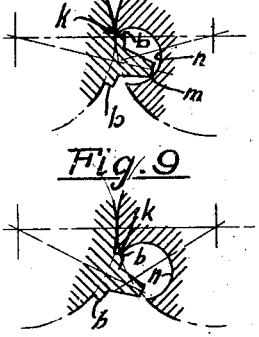
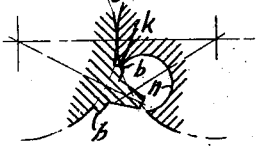
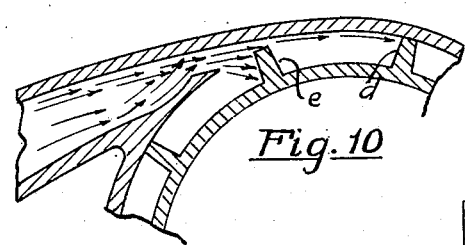
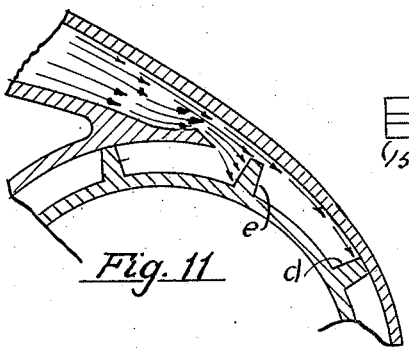
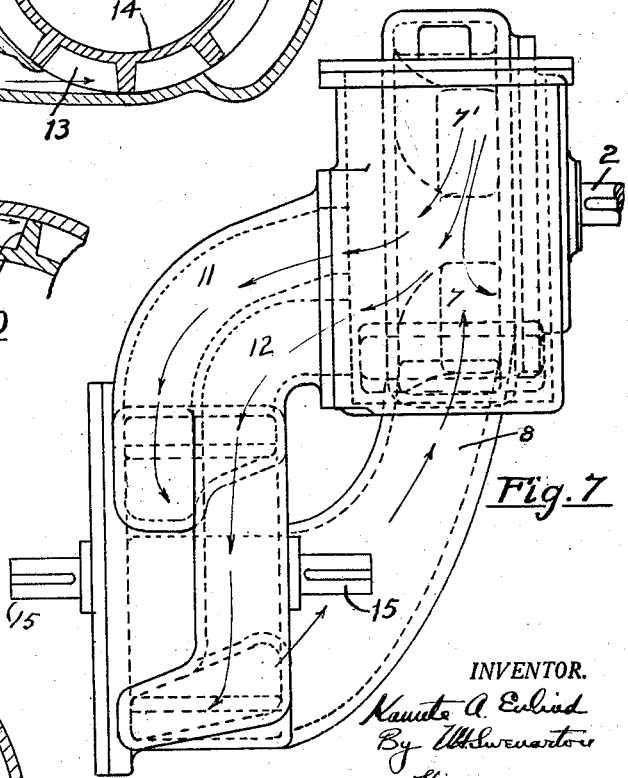

1,756,977

UNITED STATES PATENT OFFICE

KANUTE A. ENLIND, OF JAMAICA, NEW YORK

FLUID DRIVE FOR AUTOMOBILES

Application filed June 6, 1925. Serial No. 35,338.

This invention relates to fluid transmission or driven mechanism for connecting a high speed driving shaft to a relatively low speed driven shaft, the same being especially suitable for eliminating the present clutch mechanism employed for transmitting power from a shaft of an internal combustion engine to the axle of a vehicle or the propeller shaft of a motor boat.

The objects of the invention are the provision of a compact, efficient, durable and economical mechanism for the above described purposes which is reliable in operation and simple to operate and which can be readily substituted for the present clutch mechanism in automobiles, motor trucks, motor boats and the like without requiring expensive reconstruction thereof.

My invention is fully described in its preferred embodiment in the following detail specification and drawings forming a part thereof in which latter Figure 1 is a front elevation of one form thereof;

Fig. 2 is a plan view;

Fig. 3 is a side elevation partly in section along the line 3—3 of Fig. 1 (Figs. 1, 2 and 3 illustrating the form of apparatus adapted to be employed in conjunction with mechanism (not shown) for imparting a four-wheel drive to a self-propeller vehicle, such as an automobile);

Figs. 4 and 5 illustrate a modified and more compact form of apparatus adapted to be employed in conjunction with a two-wheel drive—Fig. 4 being a front elevation and Fig. 5 a side elevation, partly in section, along the line 5—5 of Fig. 4;

Fig. 6 is a vertical longitudinal section of the construction shown in Fig. 1; Fig. 7 is an elevation from the opposite side of that shown in Fig. 3;

Fig. 8 shows in detail the impeller teeth shown in Fig. 6, but in a different position;

Fig. 9 shows in detail said impeller teeth in still another position;

Fig. 10 is a vertical section of the intake conduit leading to the drive chamber;

Fig. 11 is a vertical section of a modified form of intake conduit wherein the conduit projects at a different angle with reference to the case from the angle shown in Fig. 10.

Like reference characters indicate like parts throughout the drawings.

Referring to the drawings, the apparatus comprises a casing 1, carrying a rotatable shaft 2 adapted to be connected to the driving shaft of a prime mover such as that of an internal combustion engine. Attached to shaft 2 is an impeller 3, which is geared to a second impeller 4, that is mounted upon countershaft 5 rotating in suitable bearings (not shown) in casing 1. Casing 1 is filled with a suitable motive fluid, such as lubricating oil, which is circulated in a manner hereinafter to be described, by the rotation of impellers 3 and 4 which function as a rotary pump in a suitable chamber 6 (Fig. 6) formed in the casing. Connected with one side of this chamber is in an intake conduit 7 and to the other side thereof a discharge conduit 7'. Near the discharge end of intake conduit 7 is a suction pipe or other suitable passage 8 to the second casing 9. The discharge conduit 7' is operatively connected with one end of ways in a movable valve element 10, adapted to align respectively therewith by manual or other rotation of such element, no claim being made herein to the specific construction of such valve element. These ways are so constructed and arranged that the outlets thereof may be optionaly brought into communication either wholly or partially with either intake conduit 7, forward drive conduit 11, or reverse drive conduit 12. Conduits 11 and 12 connect with a turbine chamber 13, wherein a turbine member 14 is rotatably mounted upon shaft 15 having suitable bearings (not shown) in casing 1.

The impellers 3 and 4 are of similar construction having three radial teeth 16 projecting at intervals of 120° from the respective impellers. Each tooth is of a length corresponding to the width of the chamber 1 (see Figs. 3 and 5) and is slightly rounded at its outermost end to an arc substantially of the same radius of curvature as that of fragmental arc shaped walls or partitions c, c' of casing 1 (see Fig. 6). Each tooth is enlarged at its base to form shoulders $b$, which function in the manner hereinafter described. As shown, the teeth 16 of each impeller are of just sufficient length to engage the respective arc-shaped portions $c$, $c'$ of the walls of the impeller chamber, which portions $c$, $c'$ are each of a little less than 240° in extent so that at all times an impeller tooth of each impeller is in engagement with the adjacent curved wall $c$ or $c'$.

The forward and reverse intake conduits 11 and 12 which discharge into the turbine chamber 9, are preferably contracted at their discharge ends and project into the casing of said turbine chamber at such an angle as to deliver fluid with a maximum momentum against the rear face such as $d$ of a tooth passing such discharge end or port while reducing to a minimum the back pressure against the front face of another tooth as designated, for example, by the reference letter $e$.

As constructed, (see Figs. 6 and 8 for example) the rectilineal distance between the edge $m$ of a tooth of an impeller and the outermost edge of the shoulders $b$ at the base of the teeth 16 is exactly equal to the rectilineal distance between the top of the outermost edges of two opposing shoulders $b$, and this distance is also equal to the chord of the arc of the circle recess 17 at the mouth thereof, and as a consequence, as shown in Fig. 6, the two outermost edges of such opposing shoulders will engage the opposing outer edges of the recess 17 when the impellers are in the position shown in Fig. 6, and at all the times that the tooth of one impeller is within a recess 17 when the impellers are being driven in the direction indicated by the arrows in Fig. 6, some portion of the vertical wall of the shoulders $b$ will engage the wall of said recess while at the same time some portion of the end of an impeller tooth will likewise engage the wall of such recess, and when the tooth is in the position shown in Fig. 6, there will be three points of sealing contact, namely, the upper edges of each shoulder $b$ with the adjacent outer edge of the recess 17, and also the line contact between the end of the impeller tooth and the inner wall of said recess.

The mode of operation of the apparatus is as follows:

With the engine or other prime mover rotating in a clockwise direction, as indicated by the arrow in Fig. 6, the motive fluid is drawn into the power portion of chamber 6 from the turbine chamber 9 and forced by the impellers to the three-way valve element where it passes through one of the ports of the rotor element 10. Where the apparatus is installed as an automobile transmission, suitable connections are employed whereby the driver may conveniently vary the position of the rotor element 10 with reference to the ports in the valve casing 10' to its connecting conduits. With the automobile at rest and the engine idling, the movable rotor 10 is so positioned that the motor will be idling and the fluid merely circulated through chamber 6 without appreciable consumption of power and without operation of turbine 14.

In starting the automobile, the driver moves the rotor 10 in one direction to such a position that all the power of the engine is avilable for forcing a relatively small quantity of motive fluid to turbine 14, causing slow rotation thereof, and as the same is operatively connected to the driven shaft, the high torque necessary to starting is obtained. As the vehicle accelerates in speed, movable valve element 10 is progressively rotated until it is in a forward drive position, thereby imparting maximum forward speed to the vehicle. With the vehicle at rest and the engine idling, the operation of reversing is effected in the same manner as just described, except that the movable valve member is rotated in the opposite direction—the movable valve element position in this case being such that the motive fluid is forced through reversing conduit 12, thus driving turbine 14 in a counterclockwise direction. In whichever direction turbine 14 may be driven, the motive fluid passes through the turbine chamber and enters turbine discharge chamber 9, from which it is continually drawn by the impellers into impeller chamber 6.

Referring to Figs. 1, 2, 3, 6 and 7 turbine shaft 15 is adapted to be operatively connected by suitable transmitting means and in a manner well known to those skilled in the art, to the front and rear axles respectively of an automobile, thus effecting a four-wheel drive thereof. In the construction shown in Figs. 4 and 5, the turbine shaft is to be operatively connected in the usual manner to a drive shaft which actuates the differential gear mechanism in the driving axle.

One highly desirable feature of my invention consists in so constructing the teeth and sockets 16 and 17 as to produce an intermeshing thereof which results in insuring that there shall be at all times two lines of contact between the driving and the driven impellers, thus in effect producing a double seal. The effect of this mode of operation is to practically preclude leakage between the impellers—the action being analogous to the principle of water packed piston rings in steam engine practice. Referring to Figs. 6, 8 and 9, I accomplish this result in the following manner:

When the tooth of impeller 3 is leaving the socket of impeller 4, the upper edge $k$ of the socket is forming a line contact with the base of the lateral face of shoulder $b$ of impeller 3 and simultaneously the lower edge $m$ of the tooth of impeller 3 is forming a line contact with the inner face $n$ of the socket of impeller 4. When the outer end of such tooth is entirely within the socket, there is a considerable area of contact between said tooth and said socket. Before this contact is broken, the upper edge $k$ of the lateral face of the socket of impeller 4 comes into line contact with the top edge $o$ of the shoulder $b$ of the tooth of impeller 3, as shown in Fig. 8 and the peripheral portions of the bodies of the impellers to one side of their respective tooth and socket are in close proximity to each other as shown in Fig. 9. Before the said contact is broken, a tooth of impeller 4 is entering a socket of impeller 3, forming a line contact therewith.

My invention eliminates the objectionable features of change-speed gear transmissions, and comprises simple, convenient and efficient means for transmitting and directing fluid under pressure in order to produce any desired speed.

My improved drive mechanism is almost entirely free of vibration, as owing to the absence of leakage between the impeller members no intermittent damming occurs of a current of oil which would otherwise escape therebetween at intervals and there is consequently a steady discharge of oil from the pump chamber during the operation of the prime mover.

The advantages of an efficient hydraulic drive mechanism are many and include the elimination of a clutch mechanism, the flexibility of the transmission whereby an infinite number of speeds, either forward or reverse can be obtained, the elimination of any possibility of stripping the gears from the improper manipulation of the gear shift lever as so often occurs at present, the hill climbing capabilities of a vehicle equipped therewith beside many other advantages which have long been recognized as characteristic of a fluid drive, but hitherto unobtainable by mechanism heretofore devised.

Each recess or socket 17 in each impeller is described from a center in a radius common to the centers of each impeller and is a depth substantially equal to the combined or total depth of one of the wedge-shaped teeth 16 and its base so that when a tooth intermeshes with a socket, as shown in Fig. 1, the peripheries of each impeller will be substantially in contact, but not actually in sufficient proximity to create objectionable friction.

Having thus described my invention, what I claim and desire to obtain by United States Letters Patent is:

1. In a pump for a transmission mechanism, a pair of intermeshing impeller members, each member having a series of peripheral, radial, wedge-shaped teeth substantially of the width of such impeller, each tooth having an abrupt shoulder adjacent the base thereof and extending the entire length of said base and each impeller having a series of peripheral circular recesses adapted to coact with the teeth on the opposing intermeshed impeller during the rotation thereof, said recesses being each of a width at the mouth thereof corresponding to the extreme distance between the upper edges of two opposing shoulders or any one of said teeth and said recesses described from a center in the common radius which includes the centers of the two impeller members when an impeller tooth is in a position that its axis coincides with such radius, whereby said impellers when mounted so that their peripheries are in close proximity to each other will have two points of sealing contact during the entire period their respective impeller teeth are passing through a recess in an opposing impeller.

2. In a pump for a transmission mechanism, a plurality of intermeshing impellers and supplemental meshing elements including wedge-shaped radially projecting teeth and peripheral recesses adapted to receive such teeth during the rotation of said impellers, said teeth having enlarged base portions forming contact shoulders adapted to at all times engage a portion of a wall of a recess carried by a coacting impeller and continuously seal on at least two line contacts, the space between the wall of said recess and the peripheral surfaces of said impellers.

3. In a pump for a transmission mechanism, a pair of inter-meshing impeller members, each member having an essential cylindrical but interrupted periphery and the cylindrical portions of such peripheries being adapted to have sealing engagement with each other, said impeller members being each provided with longitudinal extending recesses and longitudinal extending projecting teeth, said recesses conforming in cross section to an arc of a circle, and said teeth being adapted to project at intervals during rotation of the impeller members into a recess of an opposing impeller, the said teeth each having an abrupt shoulder adjacent the base thereof and extending the entire length of the base of such tooth, said recesses being described from a center in the common radius which includes the centers of the two impeller members when the axis of the tooth of one of the impellers is in alignment with such radius, and the extreme upper edges of said shoulders being distant from each other a distance equal to the distance across the mouth of each recess and also equal to the distance from one of such upper edges of such shoulders to the furthermost outer edge of the impeller tooth projecting outwardly from such shoulder member, whereby the recesses are always sealed on two different lines against the passage of fluid during the time when a tooth is co-acting with a recess, and the cylindrical portions of the peripheries of the respective impellers are temporarily out of engagement with each other.

4. In a pump for a transmission mechanism, a pair of inter-meshing impeller members having an interrupted cylindrical periphery, each member having an alternate series of recesses of arc-shaped cross section and projecting teeth, such recesses and such teeth extending longitudinally a distance equal to the longitudinal distance that the cylindrical portions of said impellers are adapted to engage each other, and each tooth being adapted to periodically co-act with a recess of an opposing impeller, and means whereby at least two lines of sealing engagement are insured between the portions of the impellers projecting beyond the normal cylindrical periphery thereof and the wall of a co-acting recess during the entire time when a tooth and a recess of an opposing impeller are co-acting.

Signed at New York, in the county and State of New York, this 3rd day of June, 1925.

KANUTE A. ENLIND.